United States Patent
Park et al.

(10) Patent No.: US 8,085,738 B2
(45) Date of Patent: Dec. 27, 2011

(54) PREAMBLE RETRANSMISSION METHOD IN MOBILE COMMUNICATIONS SYSTEM

(75) Inventors: Sung-Jun Park, Gyeonggi-Do (KR); Young-Dae Lee, Gyeonggi-Do (KR); Sung-Duck Chun, Gyeonggi-Do (KR); Myung-Cheul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 578 days.

(21) Appl. No.: 12/278,555

(22) PCT Filed: Feb. 5, 2007

(86) PCT No.: PCT/KR2007/000614
§ 371 (c)(1),
(2), (4) Date: Dec. 8, 2008

(87) PCT Pub. No.: WO2007/091810
PCT Pub. Date: Aug. 16, 2007

(65) Prior Publication Data
US 2009/0257407 A1   Oct. 15, 2009

Related U.S. Application Data

(60) Provisional application No. 60/771,305, filed on Feb. 7, 2006.

(30) Foreign Application Priority Data

Nov. 1, 2006   (KR) .......................... 10-2006-0107404

(51) Int. Cl.
*H04J 3/00* (2006.01)
(52) U.S. Cl. ...................................... 370/336

(58) Field of Classification Search .................. 370/336, 370/331, 337, 338, 329, 341, 342, 345, 347, 370/349, 350, 312, 321, 322, 324, 277
See application file for complete search history.

(56) References Cited

U.S. PATENT DOCUMENTS

| 5,659,756 A | 8/1997 | Hefferon et al. |
| 5,828,677 A | 10/1998 | Sayeed et al. |
| 6,088,342 A | 7/2000 | Cheng et al. |

(Continued)

FOREIGN PATENT DOCUMENTS

CN    1411668    4/2003

(Continued)

OTHER PUBLICATIONS

M. Haardt et al., "The TD-CDMA Based UTRA TDD Mode," IEEE Journal on Selected Areas in Communications, vol. 18, No. 8, pp. 1375-1385, Aug. 2000.

(Continued)

*Primary Examiner* — Chi Pham
*Assistant Examiner* — Alexander Boakye
(74) *Attorney, Agent, or Firm* — Lee, Hong, Degerman, Kang & Waimey

(57) ABSTRACT

A preamble retransmission method in an Evolved Mobile Telecommunications System (E-UMTS) system is provided by which a terminal transmits a Radio Access Channel (RACH) preamble to a base station, the base station compares the received RACH preamble with preset specific criteria and requests retransmission for the RACH preamble to the terminal according to the comparison in order to reduce the probability of data transmission failure due to inaccuracy of time synchronization and to decrease interference with transmissions by other terminals.

20 Claims, 3 Drawing Sheets

U.S. PATENT DOCUMENTS

| | | |
|---|---|---|
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narringer et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,694,148 B1 | 2/2004 | Frodigh et al. |
| 6,717,925 B1 | 4/2004 | Leppisaari et al. |
| 6,728,225 B1 | 4/2004 | Ozluturk |
| 6,795,412 B1 | 9/2004 | Lee |
| 6,859,445 B1 | 2/2005 | Moon et al. |
| 6,882,727 B1 | 4/2005 | Vialen et al. |
| 6,907,005 B1 | 6/2005 | Dahlman et al. |
| 6,907,015 B1 | 6/2005 | Moulsley et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,236,787 B1 | 6/2007 | Tamura et al. |
| 7,359,345 B2 | 4/2008 | Chang et al. |
| 7,359,349 B2 | 4/2008 | Kayama et al. |
| 7,376,424 B2 * | 5/2008 | Kim et al. ............ 455/436 |
| 7,398,108 B2 * | 7/2008 | Hondo ............ 455/561 |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,535,886 B2 | 5/2009 | Lee et al. |
| 7,590,089 B2 | 9/2009 | Park et al. |
| 7,664,059 B2 | 2/2010 | Jiang |
| 7,778,599 B2 | 8/2010 | Li et al. |
| 7,826,859 B2 | 11/2010 | Lee et al. |
| 7,848,308 B2 | 12/2010 | Lee et al. |
| 2001/0024956 A1 | 9/2001 | You |
| 2001/0046864 A1 | 11/2001 | Bhatoolaul et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang |
| 2002/0071480 A1 | 6/2002 | Marjelund et al. |
| 2002/0090004 A1 | 7/2002 | Rinchiuso |
| 2002/0093940 A1 | 7/2002 | Toskala |
| 2002/0126629 A1 | 9/2002 | Jiang et al. |
| 2002/0160744 A1 | 10/2002 | Choi |
| 2002/0181436 A1 | 12/2002 | Mueckenheim |
| 2002/0187789 A1 | 12/2002 | Diachina |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0103476 A1 | 6/2003 | Choi et al. |
| 2003/0137931 A1 | 7/2003 | Hans et al. |
| 2003/0139170 A1 | 7/2003 | Heo |
| 2003/0147371 A1 | 8/2003 | Choi |
| 2003/0149371 A1 | 8/2003 | Shiga et al. |
| 2003/0210669 A1 | 11/2003 | Vayanos et al. |
| 2003/0223393 A1 | 12/2003 | Lee |
| 2003/0236085 A1 | 12/2003 | Ho |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann |
| 2004/0057387 A1 | 3/2004 | Yi et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0109422 A1 | 6/2004 | Naito |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0180675 A1 | 9/2004 | Choi et al. |
| 2004/0185860 A1 | 9/2004 | Marjelund |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0229626 A1 | 11/2004 | Yi et al. |
| 2004/0264497 A1 | 12/2004 | Wang et al. |
| 2004/0264550 A1 | 12/2004 | Dabak |
| 2005/0008035 A1 | 1/2005 | Eklund et al. |
| 2005/0014508 A1 | 1/2005 | Moulsley |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0118947 A1 | 6/2005 | Ames et al. |
| 2005/0157696 A1 | 7/2005 | Yamamoto |
| 2005/0185608 A1 | 8/2005 | Lee |
| 2005/0190728 A1 | 9/2005 | Han et al. |
| 2005/0197134 A1 | 9/2005 | McKenna et al. |
| 2005/0207374 A1 | 9/2005 | Petrovic et al. |
| 2005/0213605 A1 | 9/2005 | Kim et al. |
| 2005/0243767 A1 | 11/2005 | Zhang et al. |
| 2005/0249141 A1 | 11/2005 | Lee et al. |
| 2005/0250500 A1 | 11/2005 | Xu |
| 2005/0260997 A1 | 11/2005 | Korale |
| 2005/0265301 A1 | 12/2005 | Heo et al. |
| 2005/0271025 A1 | 12/2005 | Guethause et al. |
| 2005/0281212 A1 | 12/2005 | Jeong et al. |
| 2005/0288026 A1 | 12/2005 | Byun et al. |
| 2006/0007886 A1 | 1/2006 | Lee et al. |
| 2006/0018289 A1 | 1/2006 | Schulist et al. |
| 2006/0025079 A1 | 2/2006 | Sutskover et al. |
| 2006/0045047 A1 | 3/2006 | Choi et al. |
| 2006/0059186 A1 | 3/2006 | Backlund |
| 2006/0062196 A1 | 3/2006 | Cai et al. |
| 2006/0146745 A1 | 7/2006 | Cai et al. |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0292982 A1 | 12/2006 | Ye et al. |
| 2007/0060146 A1 | 3/2007 | Won et al. |
| 2007/0099619 A1 | 5/2007 | Parekh et al. |
| 2007/0121543 A1 | 5/2007 | Kuchibhotla et al. |
| 2007/0135080 A1 | 6/2007 | Islam et al. |
| 2007/0140115 A1 | 6/2007 | Bienas et al. |
| 2007/0147326 A1 | 6/2007 | Chen |
| 2007/0206531 A1 | 9/2007 | Pajukoski et al. |
| 2008/0095105 A1 | 4/2008 | Sundberg et al. |
| 2008/0232291 A1 | 9/2008 | Hus et al. |
| 2009/0011769 A1 | 1/2009 | Park et al. |
| 2009/0175241 A1 | 7/2009 | Ohta et al. |
| 2009/0185477 A1 | 7/2009 | Lee et al. |
| 2010/0014430 A1 | 1/2010 | Oka |
| 2010/0034095 A1 | 2/2010 | Ho et al. |
| 2010/0105334 A1 | 4/2010 | Terry et al. |

FOREIGN PATENT DOCUMENTS

| | | |
|---|---|---|
| CN | 1658545 | 8/2005 |
| CN | 1663158 | 8/2005 |
| EP | 0617875 | 12/1997 |
| EP | 1009184 | 6/2000 |
| EP | 1041850 | 10/2000 |
| EP | 1261222 | 11/2002 |
| EP | 1361514 | 11/2003 |
| EP | 1392074 | 2/2004 |
| EP | 1441473 | 7/2004 |
| EP | 1478203 | 11/2004 |
| EP | 1496639 | 1/2005 |
| EP | 1557968 | 7/2005 |
| EP | 1599063 | 11/2005 |
| EP | 1605724 | 12/2005 |
| EP | 1684538 | 7/2006 |
| JP | 06-013959 | 1/1994 |
| JP | 09-186704 | 7/1997 |
| JP | 09-327072 | 12/1997 |
| JP | 11-308671 | 11/1999 |
| JP | 11331949 | 11/1999 |
| JP | 2000032088 | 1/2000 |
| JP | 2000-151494 | 5/2000 |
| JP | 2000-175271 | 6/2000 |
| JP | 2000-184428 | 6/2000 |
| JP | 2001-095031 | 4/2001 |
| JP | 2001-298770 | 10/2001 |
| JP | 2001522557 | 11/2001 |
| JP | 2002501695 | 1/2002 |
| JP | 2002135231 | 5/2002 |
| JP | 2002-374321 | 12/2002 |
| JP | 2003-008635 | 1/2003 |
| JP | 2003504942 | 2/2003 |
| JP | 2003504968 | 2/2003 |
| JP | 2003-174470 | 6/2003 |
| JP | 2004-128967 | 4/2004 |
| JP | 2004-312771 | 11/2004 |
| JP | 2004-320165 | 11/2004 |
| JP | 2004349884 | 12/2004 |
| JP | 2005500761 | 1/2005 |
| JP | 2005510950 | 4/2005 |
| JP | 2005-517369 | 6/2005 |
| JP | 2005522923 | 7/2005 |
| JP | 2005-217743 | 8/2005 |
| JP | 2005525720 | 8/2005 |
| JP | 2005-236988 | 9/2005 |
| JP | 2005-237013 | 9/2005 |
| JP | 2005-244958 | 9/2005 |
| JP | 2005-536168 | 11/2005 |
| JP | 2005-539462 | 12/2005 |
| JP | 2006-014372 | 1/2006 |
| JP | 2006-020044 | 1/2006 |
| JP | 2006-505998 | 2/2006 |
| JP | 2006-352705 | 12/2006 |
| KR | 1020010111634 | 12/2001 |
| KR | 1020010111637 | 12/2001 |
| KR | 20040048675 | 6/2004 |
| KR | 20040064867 | 7/2004 |
| KR | 20040089937 | 10/2004 |
| KR | 1020050122979 | 12/2005 |
| KR | 1020060016436 | 2/2006 |
| KR | 1020060040367 | 5/2006 |
| RU | 2168278 | 5/2001 |
| RU | 2191479 | 10/2002 |
| RU | 2232469 | 7/2004 |
| RU | 2232477 | 7/2004 |
| RU | 2237380 | 9/2004 |
| RU | 2270526 | 2/2006 |
| RU | 2009106289 | 8/2010 |
| TW | 407407 | 10/2000 |
| TW | 552815 | 9/2003 |
| TW | 586283 | 5/2004 |
| TW | 589818 | 6/2004 |
| TW | 592412 | 6/2004 |
| TW | 1228008 | 2/2005 |
| TW | 1229268 | 3/2005 |
| TW | 1229514 | 3/2005 |
| TW | 200522579 | 7/2005 |
| TW | 1237478 | 8/2005 |
| TW | I239731 | 9/2005 |
| TW | I239756 | 9/2005 |
| TW | 1242951 | 11/2005 |
| TW | 280755 | 5/2007 |
| WO | 99/044383 | 9/1999 |
| WO | 9960729 | 11/1999 |
| WO | 99/63713 | 12/1999 |
| WO | 02/003720 | 1/2002 |
| WO | 02/39760 | 5/2002 |
| WO | 02/43403 | 5/2002 |
| WO | 02/47417 | 6/2002 |
| WO | 02075442 | 9/2002 |
| WO | 02/102110 | 12/2002 |
| WO | 03/007636 | 1/2003 |
| WO | 03/017691 | 2/2003 |
| WO | 03/043259 | 5/2003 |
| WO | 03/056723 | 7/2003 |
| WO | 03/096571 | 11/2003 |
| WO | 2004/030393 | 4/2004 |
| WO | 2004/034656 | 4/2004 |
| WO | 2004045234 | 5/2004 |
| WO | 2004/089030 | 10/2004 |
| WO | 2005/018269 | 2/2005 |
| WO | 2005/036917 | 4/2005 |
| WO | 2005/055472 | 6/2005 |
| WO | 2005/074312 | 8/2005 |
| WO | 2005/088886 | 9/2005 |
| WO | 2005099125 | 10/2005 |
| WO | 2005/109695 | 11/2005 |
| WO | 2005/109837 | 11/2005 |
| WO | 05/125125 | 12/2005 |
| WO | 2006/011953 | 2/2006 |
| WO | 2006/012946 | 2/2006 |
| WO | 2007091831 | 8/2007 |

OTHER PUBLICATIONS

Siemens, "States in E-UTRAN," R2-052051, 3GPP TSG-RAN WG RAN2#48, Aug. 2005.

China Mobile Communications Co., "RRC States Analysis in LTE," R2-052140, 3GPP TSG RAN WG2 #48, Aug. 2005.

Qualcomm Europe, "Signaling optimization for E-UTRAN," R2-052407, 3GPP TSG-RAN WG 2 meeting #48-bis, Oct. 2005.

Panasonic, "E-UTRA Transport and Logical Channels," R2-052860, 3GPP TSG RAN WG2#49, Nov. 2005.

Ericsson, "E-UTRA Random Access"; TSG-RAN WG1 #43; Seoul, Korea; Nov. 2005; R1-051445.

Sarkar, S., et al., "Common-Channel Soft Handoff in CDMA2000," IEEE Transactions on Microwave Theory and Techniques, Jun. 2000, pp. 938-950, vol. 48, Issue 6.

NTT Docomo, et al., "Multiplexing Method of Shared Control Channel in Uplink Single-Carrier FDMA Radio Access," 3GPP TSG-RAN WG1, R1-051143, Oct. 10, 2005.

Huawei, "Further Considerations on Multiplexing Method of Shared Control Channel in Uplink Single-Carrier FDMA," 3GPP TSG-RAN WG1, R1-051430, Nov. 7, 2005.

Philips, "Evolved Paging Indicators for LTE," 3GPP TSG-RAN WG2, R2-052985, Nov. 7, 2005.

NTT Docomo, et al., "Paging Channel Structure for E-UTRA Downlink," 3GPP TSG-RAN WG1, R1-060034, Jan. 23, 2006.

LG Electronics Inc., "HARQ and ARQ Operation," 3GPP TSG-RAN WG2, R2-060106, Jan. 9, 2006.

LG Electronics Inc., "Framing in the MAC Entity," 3GPP TSG-RAN WG2, R2-061012, Mar. 27, 2006.

Motorola, "Paging Channel Design for E-UTRA," 3GPP TSG-RAN WG1, R1-061712, Jun. 27, 2006.

LG Electronics Inc., "UE state transition in LTE_ACTIVE," 3GPP TSG-RAN WG2#52, R2-061002, Mar. 27, 2006.

Ericsson, "LTE States in E-UTRAN," 3GPP TSG-RAN WG2 Meeting #48bis, R2-052425, Oct. 10, 2005.

Xu, H., et al.; "Performance Analysis on the Radio Link Control Protocol of UMTS System"; 2002 IEEE 56th Vehicular Technology Conference Proceedings; pp. 2026-2030; Sep. 2002.

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.

Ericsson, "Solution for sending NAS together with RRC connection request", 3GPP TSG-RAN WG2#58, R2-071817, May 7, 2007.

LG Electroncs Inc., "Default SRB for initial access", 3GPP TSG-RAN WG 2 LTE Ad-hoc, R2-061958, Jun. 27, 2006.

LG Electronics Inc., "UE State Transition in LTE_ACTIVE," R2-061002, 3GPP TSG-RAN WG2 #52, Mar. 2006.

* cited by examiner

[Fig. 1]
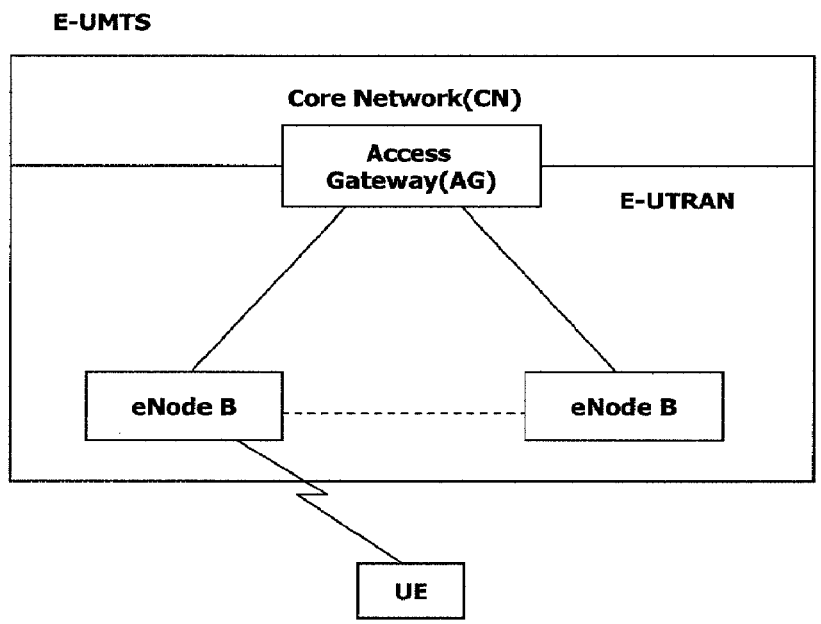
[Fig. 2]
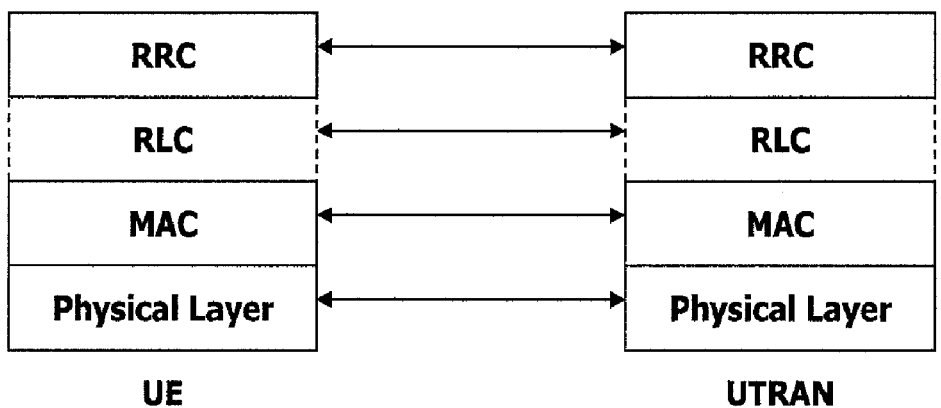
[Fig. 3]
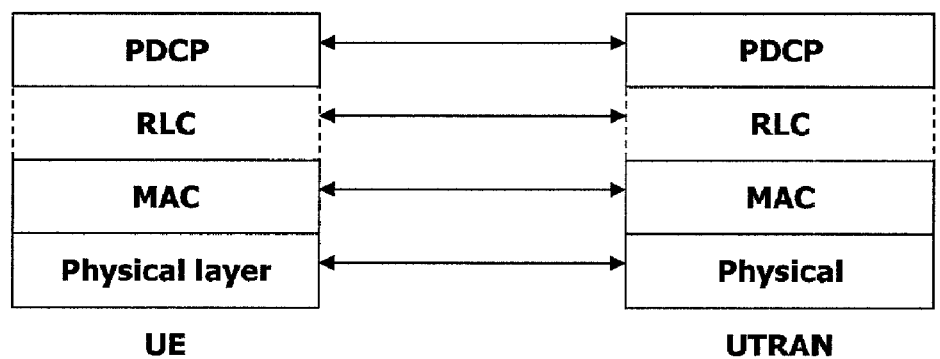

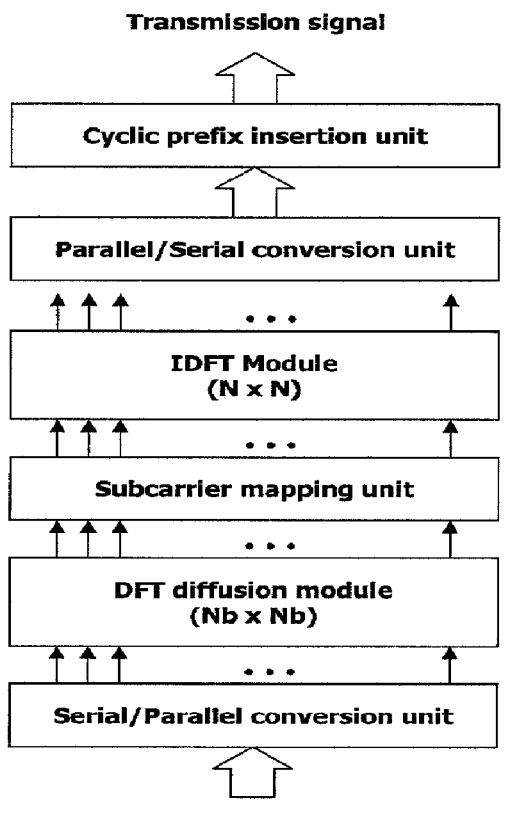
[Fig. 4]
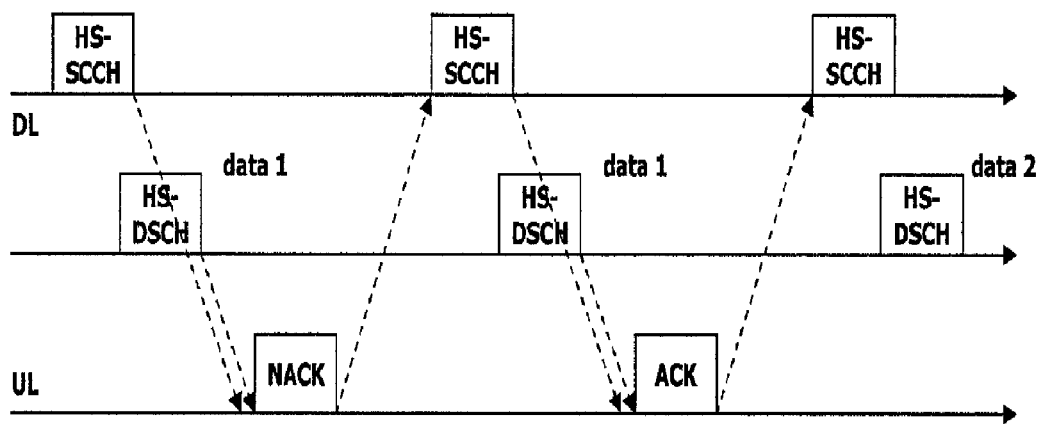
[Fig. 5]

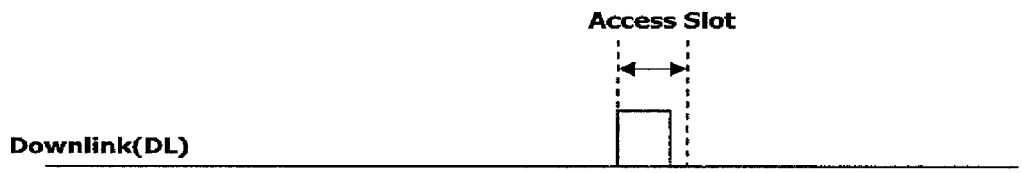
[Fig. 6]
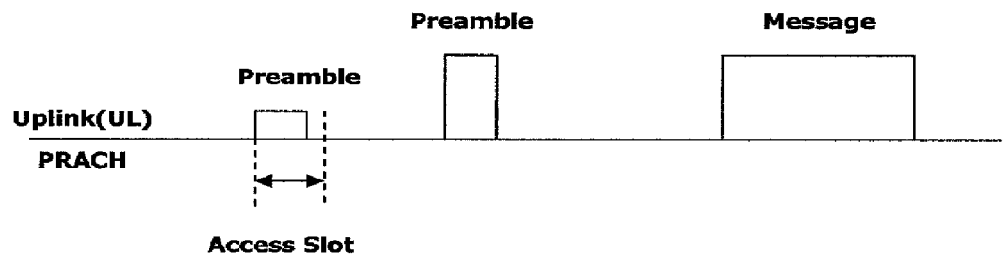
[Fig. 7]
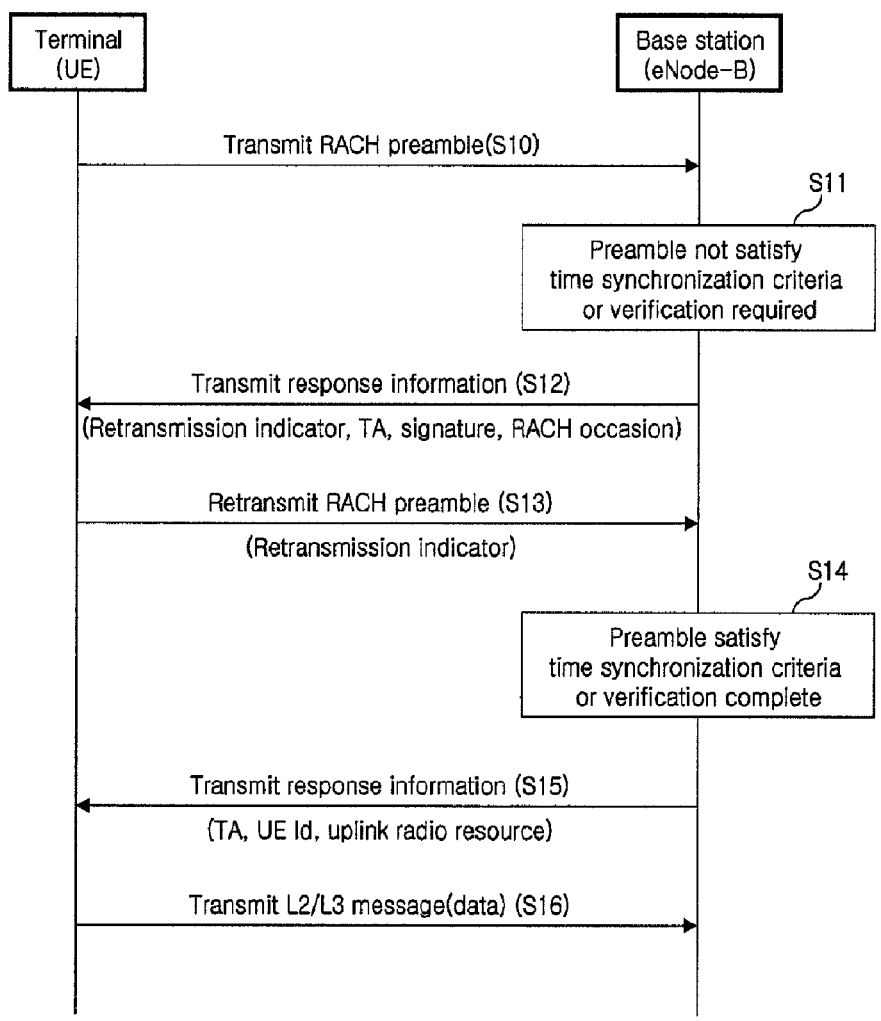

PREAMBLE RETRANSMISSION METHOD IN MOBILE COMMUNICATIONS SYSTEM

CROSS-REFERENCE TO RELATED APPLICATIONS

This application is a 371 U.S. national stage application of International Application No. PCT/KR 2007/000614, filed on Feb. 5, 2007, which claims priority to Korean Application No. 10-2006-0107404, filed on Nov. 1, 2006, and U.S. Provisional Application Ser. No. 60/771,305, filed on Feb. 7, 2006, the contents of which are incorporated by reference herein in their entirety.

DISCLOSURE OF INVENTION

Technical Solution

The present invention is directed to an Evolved Universal Mobile Telecommunications System (E-UMTS) and specifically, to retransmission of a transport channel preamble method in a mobile communications system for an uplink time synchronization faster between a terminal and a base station.

FIG. 1 illustrates a network structure of an E-UMTS, which is a mobile communications system to which both the related art and the present invention are directed. The E-UMTS system is a system that has evolved from an existing UMTS system.

A Third Generation Partnership Project (3GPP) is currently developing basic standardization for the E-UMTS system. The E-UMTS system may be referred to as a Long Term Evolution (LTE) system.

As illustrated in FIG. 1, an E-UMTS network may consist of an E-UTRAN and a Core Network (CN). The E-UTRAN may include User Equipment (UE), a base station, referred to as eNode B or eNB, and an Access Gateway (AG) located at the end of the network and connected to an external network.

The AG may be classified into a portion for processing user traffic and a portion for processing control traffic. The AG portion for processing user traffic and the AG portion for processing control traffic may be connected to each other via a new interface for communication.

One or more cells may exist in an eNode B (eNB). The eNode Bs may be connected by an interface for the transmission of user traffic or control traffic.

The CN may also include the AG and a node for registering a user of the UE. An interface may also be provided in the E-UMTS in order to classify the E-UTRAN and the CN.

Radio interface protocol layers between a mobile terminal and network may be classified into a first layer (L1), a second layer (L2) and a third layer (L3) based upon the lower three layers of an Open System Interconnection (OSI) model which is well known in communications systems. A physical layer of the first layer provides an information transfer service using a physical channel. A Radio Resource Control (RRC) layer positioned in the third layer controls radio resources between the mobile terminal and the network.

The RRC layer exchanges RRC messages between the mobile terminal and the network. The RRC layer may be positioned in each network node, such as the eNode B and the AG, or positioned in either the eNode B or the AG.

FIG. 2 illustrates an architecture of control plane of a radio interface protocol between a terminal and a UMTS Terrestrial Radio Access Network (UTRAN) based upon a 3GPP radio access network specification. The radio interface protocol is horizontally represented by a physical layer, a data link layer and a network layer and vertically represented by a user plane for transmitting data and the control plane for transmitting control signals.

The protocol layers of FIG. 2 may be classified into a first layer (L1), a second layer (L2) and a third layer (L3) based upon the lower three layers of an Open System Interconnection (OSI) model which is well known in communications systems. Each radio protocol layer in the control plane illustrated in FIG. 2 and each radio protocol layer in the user plane illustrated in FIG. 3 will now be explained.

A physical layer, which is a first layer, provides an information transfer service to an upper layer using a physical channel. The physical layer is connected to a Medium Access Control (MAC) layer located thereabove via a transport channel.

Data is transferred between the MAC layer and the physical layer via a transport channel. Data also is transferred between different physical layers, specifically, between a physical layer of a transmitting side and a physical layer of a receiving side.

A MAC layer of the second layer provides a service via a logical channel to a Radio Link Control (RLC) layer, which is its upper layer. The RLC layer of the second layer supports reliable data transmission.

It should be noted that the RLC layer is depicted in dotted lines, because if the RLC functions are implemented in and performed by the MAC layer, the RLC layer itself may not need to exist.

A Packet Data Convergence Protocol (PDCP) layer of the second layer is used to effectively transmit data using an IP packet, such as IPv4 or IPv6, on a radio interface with a relatively narrow bandwidth. The PDCP layer performs header compression to reduce the size of a relatively-large IP packet header containing unnecessary control information.

A Radio Resource Control (RRC) layer located at the lowest portion of the third layer is only defined in the control plane. The RRC layer handles the transport and physical channels for the configuration, re-configuration and release of radio bearers. A Radio Bearer (RB) denotes a service provided by the second layer for data transfer between the mobile terminal and the UTRAN.

Downlink transport channels for transmitting data from a network to a mobile terminal may include a Broadcast Channel (BCH) for transmitting system information and a downlink Shared Channel (SCH) for transmitting user traffic or control messages. The user traffic or control messages of a downlink multicast service or broadcast service may be transmitted either via the downlink SCH or via an additional downlink Multicast Channel (MCH). Uplink transport channels for transmitting data from a mobile terminal to a network may include a Random Access Channel (RACH) for transmitting an initial control message and an uplink Shared Channel (SCH) for transmitting user traffic or control messages.

An Orthogonal Frequency Division Multiplexing (OFDM) method used in a physical layer, which is a first layer, will now be explained. A basic principle of OFDM is to divide a data stream having a high transmission rate, or high-rate, into a plurality of data streams having a low transmission rate, or low-rate, and simultaneously transmit the plurality of data streams using a plurality of carriers.

The plurality of carriers are referred to as subcarriers. Orthogonality between the subcarriers allows frequency elements of carriers to be detected by a receiving side even if the elements are overlapped with each other.

The high-rate data stream is converted into a plurality of low-rate data streams by a serial-to-parallel converter. A subcarrier multiplies the plurality of parallel-converted data streams. The data streams are then added and transmitted to the receiving side.

The plurality of data streams converted by the serial-to-parallel converter may be transmitted to a plurality of subcarriers using Inverse Discrete Fourier Transform (IDFT). The IDFT can efficiently be implemented by adapting an Inverse Fast Fourier Transform (IFFT).

A symbol duration of a low-rate subcarrier in the OFDM is increased in order to decrease a relative signal dispersion generated by a multi-path delay profile based upon time. Inserting a guard interval between OFDM symbols that is longer than delay dispersion of a channel may reduce an inter-symbol interference. The OFDM symbol is cyclically extended in order to enable protection of the symbol if a part of OFDM signal is copied and arranged in the guard interval.

A related art Orthogonal Frequency Division Multiple Access (OFDMA) will now be explained. The OFDMA refers to a multiple access method for enabling multiple access by providing an individual user with part of a subcarrier that can be used in a system adapting the OFDM as a modulation method.

The OFDMA provides an individual user with a frequency resource called a subcarrier. Each frequency resource is independently provided to many individual users such that they are not overlapped with one another. Therefore, the frequency resource is exclusively allocated A Discrete Fourier Transform-Single-Orthogonal Frequency Multiple (DFT-S-OFDM) method is called Single Carrier Frequency Division Multiple Access FDMA (SC-FDMA). A related art SC-FDMA scheme is typically used for an uplink, wherein spreading is first applied in a manner of Discrete Fourier Transform (DFT) matrix at a frequency region before generating an OFDM signal and then the result is modulated according to a related art OFDM method for transmission.

FIG. 4 illustrates a structure of a transmitter adapting a related art DFT-S-OFDM method. Several variables are defined in order to explain an operation of the transmitter. "N" denotes the number of subcarriers transmitting an OFDM signal, "Nb" denotes the number of subcarriers for a certain user, "F" denotes a DFT matrix, "s" denotes a data symbol vector, "x" denotes a vector that data is dispersed at a frequency region, and "y" denotes an OFDM symbol vector transmitted at a time region.

The SC-OFDM disperses data symbols using the DFT matrix, as shown in Equation 1, before transmitting the data symbol "s".

$$x = F_{N_b \times N_b} s \, F_{N_b \times N_b}$$ [Equation 1]

denotes a DFT matrix of size "Nb" that is used to disperse the data symbol "s." Subcarrier mapping is performed for the dispersed vector "x" by adapting a certain subcarrier allocating method. The subcarrier mapped vector "x" is then converted into a time region by an IDFT module in order to obtain a signal for transmission to a receiving side, as shown in Equation 2.

$$y = F_{N \times N}^{-1} x \quad \text{Equation 2}$$

"

$F_{N \times N}$

" denotes a DFT matrix of size "N" that is used to convert a signal of a frequency region into a signal of a time region. The size of the DFT matrix may be controlled for a specific purpose. By including an inserted cyclic prefix A, transmission signal "y" generated by the method is transmitted. A method for generating a transmission signal by adapting the aforementioned method is referred to as an SC-OFDM scheme.

A related art Hybrid ARQ (HARQ) scheme will now be explained. FIG. 5 illustrates a method for implementing HARQ for a downlink physical layer of a radio packet communications system.

As illustrated in FIG. 5, a base station determines a terminal that is to receive a packet and information, such as a packet type, for transmission to the terminal. The base station informs the terminal of the corresponding information, such as coding rate, modulation method and amount of data, by transmitting a High-Speed downlink control channel (HS-SCCH).

The base station then transmits the corresponding data packet via High-Speed Downlink Shared Channel(HS-DSCH), at a time associated with the downlink control channel. The corresponding terminal receives the downlink control channel, identifies a packet type to be transmitted and a transmission time point, and receives the corresponding packet. The terminal then attempts to decode the received packet data.

The terminal transmits an ACK signal to the base station if the packet data is successfully decoded. The base station receives the ACK signal, detects successful packet transmission and transmits of a next packet.

The terminal transmits a NACK signal to the base station if the packet data is not successful decoded. The base station receives the NACK signal and detects unsuccessful packet transmission.

The base station can retransmit the same data in the same packet type or a new packet type at an appropriate time point. The terminal uses various schemes to combine the retransmitted packet with a packet that was previously received but not decoded in order to again perform decoding.

A Random Access Channel (RACH) of a WCDMA will now be explained. A RACH is a transport channel for transmitting data with a short length over an uplink.

The RACH is used to transmit several RRC messages, such as an RRC connection request message, a cell update message and a URA update message. Logical channels including CCCH (Common Control Channel), DCCH (Dedicated Control Channel) and DTCH (Dedicated Traffic Channel) are mapped to the RACH. The RACH is mapped to a physical channel, such as PRACH (Physical Random Access Channel).

FIG. 6 illustrates an example of a typical PRACH. As illustrated in FIG. 6, an uplink physical channel PRACH includes a preamble portion and a message portion.

The preamble portion performs a power ramping function for adjusting appropriate transmission power used for message transmission and a function for preventing message collision among several terminals. The message portion performs a function for transmitting MAC PDUs (Protocol Data Units) from a MAC to a physical channel.

A physical layer of a terminal selects one access slot and one signature to transmit a PRACH preamble for an uplink when the MAC layer of the terminal indicates a PRACH transmission to the physical layer of the terminal. The preamble may be transmitted during an access slot interval with a length of 1.33 ms. The preamble selects and transmits one of 16 signatures for a certain length of an initial portion of the access slot.

The base station can transmit a response signal via a downlink physical channel AICH (Acquisition Indicator Channel)

once the terminal transmits the preamble. The base station transmits a positive response (ACK) or negative response (NACK) to the terminal using a response signal transmitted via the AICH.

The terminal transmits the message portion upon receiving the ACK. Conversely, the MAC layer of the terminal indicates a PRACH retransmission to the physical layer of the terminal after an appropriate time upon receiving the NACK. The terminal transmits a new preamble at a power one level higher than that of a previous preamble after a designated access slot if no response corresponding to the transmitted preamble is received.

The response with respect to the RACH preamble has been explained above. Furthermore, data or control signals may be transmitted from the base station to the terminal. The control signals transmitted from the base station to the terminal may include downlink scheduling information, uplink scheduling grant, or response information to a RACH preamble transmission from the terminal.

Explanation will now be given of the transmission of response information with respect to the RACH preamble by the base station. The base station can transmit response information when receiving a RACH preamble transmitted from the terminal.

Response information transmitted from the base station may include an adjusted value of time synchronization, such as a Time Advance (TA). An OFDM system should match an uplink time synchronization between the terminal and the base station.

An uplink data transmission of the terminal may cause interference with a data transmission of another symbol or another user if the time synchronization is not matched, thereby increasing an error rate. Accordingly, the base station receives the RACH preamble from the terminal and calculates the TA of the terminal in order to indicate the TA to the terminal.

The terminal resets a time synchronization with the base station using the received TA in order to precisely match the time synchronization with the base station. The terminal can transmit data to the base station using uplink radio resource allocation information included in the response information.

In related art methods using RACH, the terminal transmits the RACH preamble to the base station and the base station then transmits response information to the terminal including the TA for the preamble, uplink radio resource allocation information, and other information. Therefore, the terminal resets a time synchronization with the base station using the TA in order to transmit data to the base station using the uplink radio resource allocation information.

However, one time performance may not be enough to properly match the uplink time synchronization between the terminal and the base station. For example, a terminal that is moving fast presents difficulties in matching a precise time synchronization through a single RACH preamble transmission and a single TA response. Data transmissions from a fast moving terminal may fail and also may cause interference with transmissions by other terminals.

An object of the present invention is to provide retransmission of a transport channel preamble method in a mobile communications system for an uplink time synchronization faster between a terminal and a base station.

In one aspect of the present invention, a method for scheduling radio resources in a mobile communication system is provided. The method includes transmitting a transport channel preamble, receiving a response to the transmission of the transport channel preamble and one of retransmitting the transport channel preamble and transmitting information using allocated radio resources, wherein the transport channel preamble is retransmitted if the response includes a request to retransmit the transport channel preamble and the information is transmitted if the response includes an indication of allocated radio resources.

It is contemplated that the transport channel is a Random Access Channel (RACH). It is further contemplated that the response to the transmission of the transport channel preamble is a control signal.

It is contemplated that the transport channel preamble is associated with one of a RRC access request, a cell update, handover, a radio resource request and maintenance of time synchronization. It is further contemplated that retransmitting the transport channel preamble includes using a signature included in the response. Preferably, retransmitting the transport channel preamble includes including a retransmission indicator in the retransmitted preamble.

In another aspect of the present invention, a method for scheduling radio resources in a mobile communication system is provided. The method includes receiving a transport channel preamble, determining if the preamble satisfies predetermined criteria and transmitting a response to the transport channel preamble, wherein the response includes a request to retransmit the transport channel preamble if it is determined that the preamble does not satisfy the predetermined criteria and the response includes an indication of allocated radio resources if it is determined that the preamble satisfies the predetermined criteria.

It is contemplated that the predetermined criteria include at least one of an error rate of time synchronization or a number of times for performing time synchronization. It is further contemplated that the error rate of time synchronization is 80% of perfect synchronization.

It is contemplated that the transport channel is a Random Access Channel (RACH). It is further contemplated that transmitting the response to the transport channel preamble includes transmitting a control signal.

It is contemplated that the response further includes a signature for retransmission of the transport channel preamble if it is determined that the preamble does not satisfy the predetermined criteria. It is further contemplated that the transport channel preamble is associated with one of a RRC access request, a cell update, handover, a radio resource request and maintenance of time synchronization. Preferably, the method further includes receiving a retransmitted transport channel preamble and recognizing one of a signature of the retransmitted transport channel preamble and a retransmission indicator included in the retransmitted transport channel preamble in if it is determined that the preamble does not satisfy the predetermined criteria.

In another aspect of the present invention, a method for scheduling radio resources in a mobile communication system is provided. The method includes a mobile communication terminal transmitting a transport channel preamble, a network determining if the preamble satisfies predetermined criteria, the network transmitting a response to the transport channel preamble, the response including a request to retransmit the transport channel preamble if it is determined that the preamble does not satisfy the predetermined criteria and the response including an indication of allocated radio resources if it is determined that the preamble satisfies the predetermined criteria and the mobile communication terminal retransmitting the transport channel preamble if the response includes a request to retransmit the transport channel preamble and transmitting information using allocated radio resources if the response includes an indication of allocated radio resources.

It is contemplated that the transport channel is a Random Access Channel (RACH). It is further contemplated that the response to the transmission of the transport channel preamble is a control signal.

It is contemplated that the transport channel preamble is associated with one of a RRC access request, a cell update, handover, a radio resource request and maintenance of time synchronization. It is further contemplated that the predetermined criteria comprise at least one of an error rate of time synchronization or a number of times for performing time synchronization. Preferably, the error rate of time synchronization is 80% of perfect synchronization.

The foregoing and other objects, features, aspects and advantages of the present invention will become more apparent from the following detailed description of the present invention when taken in conjunction with the accompanying drawings.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 1 illustrates a network structure of an E-UMTS that is a mobile communications system to which both the related art and the present invention are applicable.

FIG. 2 illustrates each layer of a control plane of radio protocols.

FIG. 3 illustrates each layer of a user plane of radio protocols.

FIG. 4 illustrates a structure of a transmitter adopting a DFT-S-OFDM method.

FIG. 5 illustrates a method for implementing HARQ in a downlink physical layer of a radio packet communications system.

FIG. 6 illustrates one example of a typical PRACH.

FIG. 7 is a flowchart illustrating a preamble retransmission method in a mobile communications system according to the present invention.

Description will now be given in detail of the present invention, with reference to the accompanying drawings. The present invention is implemented in mobile communications systems, such as an E-UMTS. However, the present invention may be applied to other communications systems that are operated according to other specifications.

The present invention proposes a method by which a base station requests retransmission of a RACH preamble to a terminal using a particular control signal when the terminal transmits the RACH preamble to the base station using a RACH. The terminal receives the particular control signal and then retransmits the RACH preamble to the base station according to the corresponding control signal. Preferably, the particular control signal is response information with respect to the RACH preamble.

FIG. 7 is a flowchart illustrating a preamble retransmission method in a mobile communications system according to the present invention, wherein a RACH preamble is re-transmitted by a terminal in response to a request from a base station. As illustrated in FIG. 7, the terminal transmits an RACH preamble to a base station for the purpose of an RRC connection request with the base station, a cell update, handover, a radio resource request or maintenance of time synchronization (S10).

The base station compares the received RACH preamble with preset specific criteria, such as an error rate of time synchronization or the number of times for the time synchronization, in order to determine whether the RACH preamble reception meets the specific criteria. For example, if the error rate of time synchronization with the base station is over 80%, the base station determines that a time synchronization reset is additionally required. The base station can also request a time synchronization verifying procedure by more than two times of the time synchronization reset.

The base station determines either that the received RACH preamble does not meet the criteria or that a verification is required according to the comparison (S11). Therefore, the base station does not include information, such as an uplink radio resource allocation, in response information to the RACH preamble received from the terminal (S12).

The response information only includes the TA and a retransmission indicator. The retransmission indicator notifies the terminal to retransmit the RACH preamble. The response information may also include only the TA.

The base station may include additional information in the response information, such as RACH preamble signature and RACH occasion, both of which the terminal uses to retransmit the RACH preamble. The RACH occasion denotes a particular frequency and particular time for using the RACH.

The terminal retransmits the RACH preamble to the base station (S13) upon receiving the request for the RACH preamble retransmission from the base station. The terminal uses the signature included in the response information transmitted from the base station as an RACH preamble signature.

In this way, the base station can recognize that the terminal is retransmitting the RACH preamble based upon the signature. Also, a retransmission indicator may be used to inform the base station of the RACH preamble retransmission from the terminal.

The base station compares the received retransmitted RACH preamble from the terminal with the preset specific criteria, such as the error rate of time synchronization and the number of times for the time synchronization, in order to determine whether the retransmitted RACH preamble meets the criteria (S14). The base station transmits response information including the TA, UE Id and uplink radio resource allocation information when it is determined that the retransmitted RACH preamble meets the criteria or the verification for the RACH preamble was completed (S15). The response information may only include the TA if the terminal uses the RACH in order to maintain the time synchronization.

The terminal resets the time synchronization with the base station using the TA included in the response information and transmits data to the base station using the uplink radio resource (S16). Step S16 may not be performed if the terminal uses the RACH in order to maintain the time synchronization.

As described herein, a base station compares a received RACH preamble with preset particular criteria, such as an error rate for time synchronization and the number of times for the time synchronization, when a terminal transmits a RACH preamble to a base station in order to use a RACH. The base station requests retransmission of the RACH preamble to the terminal If the RACH preamble does not meet the criteria in order to reduce probability of data transmission failure due to inaccuracy of time synchronization and to decrease interference with transmissions by other terminals.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method for scheduling radio resources in a mobile communication system, the method comprising:
    transmitting a transport channel preamble;
    receiving a response to the transport channel preamble, wherein the response is transmitted by a base station after the base station determines that the transport channel preamble satisfies predetermined criteria, and wherein the response comprises a request to retransmit the transport channel preamble if it is determined that the transport channel preamble does not satisfy the predetermined criteria, and the response comprises an indication of allocated radio resources if it is determined that the transport channel preamble satisfies the predetermined criteria; and
    one of retransmitting the transport channel preamble and transmitting information using allocated radio resources, wherein the transport channel preamble is retransmitted if the response comprises the request to retransmit the transport channel preamble and the information is transmitted if the response comprises the indication of allocated radio resources.

2. The method of claim 1, wherein the transport channel is a Random Access Channel (RACH).

3. The method of claim 1, wherein the response to the transport channel preamble is a control signal.

4. The method of claim 1, wherein the transport channel preamble is associated with one of a Radio Resource Control (RRC) connection request, a cell update, handover, a radio resource request and maintenance of time synchronization.

5. The method of claim 1, wherein retransmitting the transport channel preamble comprises using a signature included in the response.

6. The method of claim 1, wherein retransmitting the transport channel preamble comprises including a retransmission indicator in the retransmitted preamble.

7. A method for scheduling radio resources in a mobile communication system, the method comprising:
    receiving a transport channel preamble;
    determining if the preamble satisfies predetermined criteria; and
    transmitting a response to the transport channel preamble, wherein the response comprises a request to retransmit the transport channel preamble if it is determined that the preamble does not satisfy the predetermined criteria and the response comprises an indication of allocated radio resources if it is determined that the preamble satisfies the predetermined criteria.

8. The method of claim 7, wherein the predetermined criteria comprise at least one of an error rate of time synchronization or a number of times for performing time synchronization.

9. The method of claim 8, wherein the error rate of time synchronization is 80% of perfect synchronization.

10. The method of claim 7, wherein the transport channel is a Random Access Channel (RACH).

11. The method of claim 7, wherein transmitting the response to the transport channel preamble comprises transmitting a control signal.

12. The method of claim 7, wherein the response further comprises a signature for retransmission of the transport channel preamble if it is determined that the preamble does not satisfy the predetermined criteria.

13. The method of claim 7, wherein the transport channel preamble is associated with one of a Radio Resource Control (RRC) connection request, a cell update, handover, a radio resource request and maintenance of time synchronization.

14. The method of claim 7, further comprising receiving a retransmitted transport channel preamble and recognizing one of a signature of the retransmitted transport channel preamble and a retransmission indicator included in the retransmitted transport channel preamble if it is determined that the preamble does not satisfy the predetermined criteria.

15. A method for scheduling radio resources in a mobile communication system, the method comprising:
    a mobile communication terminal transmitting a transport channel preamble;
    a network determining if the preamble satisfies predetermined criteria;
    the network transmitting a response to the transport channel preamble, the response comprising a request to retransmit the transport channel preamble if it is determined that the preamble does not satisfy the predetermined criteria and the response comprising an indication of allocated radio resources if it is determined that the preamble satisfies the predetermined criteria; and
    the mobile communication terminal retransmitting the transport channel preamble if the response comprises a request to retransmit the transport channel preamble and transmitting information using allocated radio resources if the response comprises an indication of allocated radio resources.

16. The method of claim 15, wherein the transport channel is a Random Access Channel (RACH).

17. The method of claim 15, wherein the response to the transmission of the transport channel preamble is a control signal.

18. The method of claim 15, wherein the transport channel preamble is associated with one of a Radio Resource Control (RRC) connection request, a cell update, handover, a radio resource request and maintenance of time synchronization.

19. The method of claim 15, wherein the predetermined criteria comprise at least one of an error rate of time synchronization or a number of times for performing time synchronization.

20. The method of claim 19, wherein the error rate of time synchronization is 80% of perfect synchronization.

* * * * *